US006642302B2

(12) United States Patent
Wamprecht et al.

(10) Patent No.: US 6,642,302 B2
(45) Date of Patent: Nov. 4, 2003

(54) POLYURETHANES AND THEIR USE FOR THE THICKENING OF AQUEOUS SYSTEMS

(75) Inventors: Christian Wamprecht, Neuss (DE); Jan Mazanek, Köln (DE); Peter Manshausen, Köln (DE); Frank Sauer, Langenfeld (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 10/091,960

(22) Filed: Mar. 6, 2002

(65) Prior Publication Data

US 2003/0065088 A1 Apr. 3, 2003

(30) Foreign Application Priority Data

Mar. 12, 2001 (DE) .......................................... 101 11 793

(51) Int. Cl.$^7$ .............................. C08J 3/00; C08K 3/20; C08L 75/00; C08G 18/00; C08G 18/10
(52) U.S. Cl. ..................... 524/589; 524/590; 524/591; 524/839; 524/840; 528/44; 528/45; 528/60; 528/61; 528/85
(58) Field of Search ................................ 524/589, 590, 524/591, 839, 840; 528/44, 45, 85, 60, 61

(56) References Cited

U.S. PATENT DOCUMENTS

| 3,362,780 | A | 1/1968 | Kuth et al. ...................... 8/42 |
|---|---|---|---|
| 4,079,028 | A | 3/1978 | Emmons et al. ..... 260/29.6 NR |
| 4,155,892 | A | 5/1979 | Emmons et al. ..... 260/29.2 TN |
| 4,499,233 | A | 2/1985 | Tetenbaum et al. ......... 524/591 |
| 5,023,309 | A | 6/1991 | Kruse et al. .................. 528/49 |

FOREIGN PATENT DOCUMENTS

| CA | 1341003 | 5/2000 |
|---|---|---|
| EP | 0 031 777 | 7/1981 |
| EP | 0 495 373 | 8/1994 |
| WO | WO96/30425 | 10/1996 |

*Primary Examiner*—Patrick D. Niland
(74) *Attorney, Agent, or Firm*—Joseph C. Gil; Thomas W. Roy; John E. Mrozinski, Jr.

(57) ABSTRACT

The invention relates to a water-soluble or water-dispersible polyurethane which is the reaction product of A) at least one polyether polyol a1) having an average functionality of ≧3 and at least one urethane group-containing polyether polyol a2) having an average functionality of ≧4, B) at least one monoalcohol with 6 to 22 carbon atoms, C) at least one (cyclo)aliphatic and/or aromatic diisocyanate D) at least one oxime, monoamine and/or diamine with 2 to 18 carbon atoms, E) optionally at least one monoisocyanate with 4 to 18 carbon atoms, and F) optionally at least one polyisocyanate having an average functionality of >2 wherein the starting NCO/OH equivalent ratio is between 0.5:1 to 1.2:1 having a particularly efficient thickening effect in the high-shear range, as well as their use for the thickening of aqueous systems.

12 Claims, No Drawings

POLYURETHANES AND THEIR USE FOR THE THICKENING OF AQUEOUS SYSTEMS

BACKGROUND OF THE INVENTION

The present invention relates to a hydrophilic/hydrophobic water-soluble or water-dispersible polyurethanes suitable as thickening agents for aqueous systems, having a particularly efficient thickening effect in the high-shear range, as well as its use for the thickening of aqueous systems.

Polyurethane-based thickening agents for aqueous systems are described in numerous publications, (see for example DE-A 1 444 243, DE-A 3 630 319, EP-A-0 031 777, EP-A-0 307 775, EP-A-0 495 373, U.S. Pat. No. 4,079,028, U.S. Pat. No. 4,155,892, U.S. Pat. No. 4,499,233 or U.S. Pat. No. 5,023,309).

A common feature of these thickening agents belonging to the prior art is the simultaneous presence of (i) hydrophilic segments in an amount of at least 50 wt. %, (ii) hydrophobic segments in an amount of at most 10 wt. % and (iii) urethane groups. The term "hydrophilic segments" is understood to mean in particular polyurethane chains with at least 5 chain members whose alkylene oxide units contains at least 60 mole % of ethylene oxide units. The term "hydrophobic segments" is understood to mean in particular hydrocarbons segments with at least 6 carbon atoms that are incorporated within the chain and/or are preferably incorporated in the terminal position.

The thickening agents according to the invention described hereinafter also preferably correspond to this definition.

These polyurethane thickening agents are suitable as auxiliary substances for adjusting the rheological properties of aqueous systems, such as automotive and industrial paints, plaster paints and coating compounds, printing inks and textile dyes, pigment printing pastes, pharmaceutical and cosmetic preparations, plant protection formulations or filler dispersions.

Although the known polyurethane thickeners have a wide application, they are nevertheless insufficiently effective for many areas of application. A particular problem in the use of polyurethane thickeners is that they must exhibit a good effect not only in the range of low shear rates (which is important in particular for the settling behaviour and flow of for example paints), but also at high shear rates (high-shear range) that occur when applying the preparations using for example brushes or rollers, or also by spraying. For these reasons in the prior art two basic types of thickeners for the respective range of the shear rates are as a rule used in a preparation, or further auxiliary substances are added, such as solvents, in order to reduce the low-shear viscosity. This often employed measure leads however to an increase in volatile and/or migration-capable fractions in the paint formulation, which is undesirable in particular for environmental protection reasons.

In the past many attempts have been made in order to improve the effectiveness of aqueous polyurethane thickeners, such as by the incorporation of hydrophobic segments in the polymer chain of the thickener or by the use of hydrophobic side chains. The increasing demands in the market have led however over the last few years to the need for even further improved products. By using thickening agents that are improved compared to the prior art either paints with improved coating properties would be obtained using the same application amount, or alternatively the same coating properties could be achieved by using a lower application amount, which would lead to economic advantages compared to the old systems.

It was an object of the invention to provide new polyurethane-based thickening agents for aqueous or mainly aqueous systems that have an improved effectiveness in the high-shear range.

This object was achieved by the hydrophilic/hydrophobic water-soluble or water-dispersible polyurethanes according to the invention which are described in more detail hereinafter. The essential feature of the invention is the specific incorporation of selected hydrophilic and/or hydrophobic segments by using special alcohols and/or special alcohol mixtures, as well as the use of special polyethers as reaction partners for the isocyanate component.

SUMMARY OF THE INVENTION

The present invention relates to a water-soluble or water-dispersible polyurethane that is a reaction product of A) at least one polyether polyol a1) having an average functionality of $\geq 3$ and at least one urethane group-containing polyether polyol a2) having an average functionality of $\geq 4$, B) at least one monoalcohol with 6 to 22 carbon atoms, C) at least one (cyclo)aliphatic and/or aromatic diisocyanate D) at least one oxime, monoamine di- and/or polyamine with 2 to 18 carbon atoms, E) optionally at least one monoisocyanate with 4 to 18 carbon atoms, and F) optionally at least one polyisocyanate having an average functionality of >2 wherein the starting NCO/OH equivalent ratio is between 0.5:1 to 1.2:1.

The present invention also relates to a process for the production of these water-soluble or water-dispersible polyurethanes by reacting in a one-stage or multi-stage reaction at an NCO/OH equivalent ratio of 0.5:1 to 1.2:1, A) a mixture of at least one polyether polyol a1) having an average functionality of $\geq 3$ and at least 1 urethane group-containing polyether polyol a2) having an average functionality of $\geq 4$, B) at least one monoalcohol with 6 to 22 carbon atoms, C) at least one (cyclo)aliphatic and/or aromatic diisocyanate, D) at least one oxime, monoamine, diamine and/or polyamine with 2 to 18 carbon atoms, E) optionally at least one monoisocyanate with 4 to 18 carbon atoms, and F) optionally at least one polyisocyanate having an average functionality of >2.

The present invention also provides for the use of the polyurethanes according to the invention for thickening aqueous systems.

DETAILED DESCRIPTION OF THE INVENTION

Polyether polyol component A) contains a mixture of a polyether polyol a1) of formula (I):

$$R_1[-O-(A)_x-H]_y \qquad (I),$$

wherein $R_1$ represents an aliphatic or araliphatic hydrocarbon radical with 4 to 36 carbon atoms and optionally having ether oxygen atoms, A represents ethylene oxide and/or propylene oxide radicals with the proviso that at least 50 mole %, preferably at least 70 mole % and more preferably 100 mole % of the radicals represent ethylene oxide radicals, x represents a number from 30 to 250, and y represents a number from 3 to 18, preferably 3 to 6 and a urethane group-containing polyether polyol a2) of formula (II):

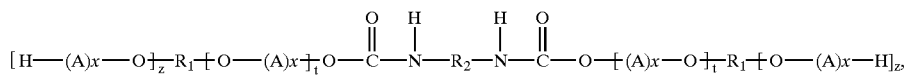

wherein $R_1$ represents an aliphatic or araliphatic hydrocarbon radical with 4 to 36 carbon atoms optionally containing ether oxygen atoms, $R_2$ represents an aliphatic, araliphatic, cycloaliphatic or aromatic radical with 4 to 12 carbon atoms, A represents ethylene oxide and/or propylene oxide radicals with the proviso that at least 50 mole %, preferably at least 70 mole % and more preferably 100 mole % of the radicals represent ethylene oxide radicals, x represents a number from 30 to 250, and y represents a number from 3 to 18, preferably 3 to 6, z represents a number from 2 to 16, preferably 2, 3 or 4, and t =(y−z).

Monoalcohol component B) contains at least one monohydric alcohol of formula (III):

$$R_3\text{—OH} \qquad (III),$$

wherein $R_3$ represents an aliphatic, cycloaliphatic, aromatic or araliphatic hydrocarbon radical with 6 to 22, preferably 6 to 18, more preferably 8 to 14 carbon atoms and optionally having inert substituents.

The component C) contains at least one diisocyanate of the formula (IV):

$$\text{OCN—}R_4\text{—NCO} \qquad (IV),$$

wherein $R_4$ represents an aliphatic, araliphatic, cycloaliphatic or aromatic radical with 4 to 22 carbon atoms and optionally containing inert substituents, e.g. halogen.

It is understood by the skilled artisan that the groups $R_3$ and $R_4$ can optionally contain substituents that preferably are inert to the isocyanate group or the hydroxy group of the respective reaction partner.

Component D) contains at least one organic molecule with at least one oxime group and/or at least one primary and/or one secondary amino group and optionally further functional groups.

Component E) contains at least one monoisocyanate of the formula (V):

$$R_3\text{—NCO} \qquad (V),$$

wherein $R_3$ has the meaning given for formula (III).

Component F) contains at least one aliphatic, araliphatic, cycloaliphatic, heterocyclic or aromatic polyisocyanate with a functionality of >2.

The production of polyether a1) on which the mixture of the polyether alcohols A) is based is carried out in a manner known per se by alkoxylation of corresponding polyhydric alcohols of formula (VI):

$$R_1\text{—[OH]}_y \qquad (VI),$$

wherein $R_1$ and y have the meaning given for formula (I), using ethylene oxide and optionally propylene oxide in a mixture and/or arbitrary sequence. Suitable initiators include glycerol, trimethylolpropane, trimethylolethane, pentaerythritol, di-trimethylolpropane, sorbitol, sugars, etc. Glycerol, trimethylolpropane and sorbitol are preferably used, and glycerol and sorbitol are more preferably used.

The production of polyether alcohol mixture A) containing polyethers a1) and urethane group-containing polyethers a2) is carried out by the partial reaction of polyethers a1) with at least one organic isocyanate having a functionality of ≧2. Preferably polyether polyol a1) has an average functionality of ≧3, more preferably of 4 to 6. In this connection up to 50 mole %, preferably up to 20 mole % and more preferably up to 10 mole % of polyethers a1) may be reacted with isocyanates. The reaction is carried out in a temperature range from 0° to 180° C., preferably 20° to 160° C. and more preferably 60° to 120° C.

Examples of monoalcohol components B) include aliphatic $C_4$–$C_{18}$ alcohols such as 1-butanol, 1-pentanol, 1-hexanol, 1-heptanol, 1-octanol, 2-ethylhexanol, 1-nonanol, 1-decanol, 1-dodecanol, stearyl alcohol, etc. Monoalcohols with 6 to 16 carbon atoms are preferred, monoalcohols with 8 to 14 carbon atoms being more preferred.

Examples of diisocyanates of component C) include aliphatic diisocyanates such as 1,4-butane diisocyanate or 1,6-hexane diisocyanate; cycloaliphatic diisocyanates such as 1-isocyanato-3,3,5-trimethyl-5-isocyanatomethyl-cyclohexane (isophorone diisocyanate), 1,3- and 1,4-cyclohexane diisocyanate, 4,4'-diisocyanatodicyclohexylmethane, etc., as well as aromatic diisocyanates such as 2,4-diisocyanatotoluene and 4,4'-diisocyanatodiphenylmethane.

Examples of component D) include organic oximes, such as acetone oxime, butanone oxime, cyclohexanone oxime or pyridine-2-aldoxime; primary aliphatic monoamines, such as methylamine, ethylamine, 1-propylamine, 2-aminopropane, 1-butylamine, sec.-butylamine, tert.-butylamine, 1-pentylamine, 1-hexylamine, 2-ethylhexylamine, 1-octylamine, 1-decylamine, 1-dodecylamine, stearylamine; primary cycloaliphatic monoamines, such as cyclohexylamine; primary araliphatic monoamines, such as benzylamine; secondary aliphatic monoamines, such as dimethylamine, diethylamine, di-n-propylamine, diisopropylamine, di-n-butylamine, diisobutylamine, secondary cycloaliphatic monoamines, such as dicyclohexylamine; primary aromatic monoamines, such as aniline; secondary aromatic monoamines, such as diphenylamine; hydroxyfunctional primary aliphatic monoamines, such as ethanolamine, isopropanolamine, 3-amino-1-propanol, 4-amino-1-butanol, 2-amino-1-butanol, 2-amino-2-methylpropanol, 2-amino-2-methyl-1,3-propanediol; hydroxyfunctional secondary aliphatic monoamines, such as diethanolamine, diisopropanolamine, N-methylethanolamine; primary aliphatic diamines, such as ethylenediamine, 1,2- and 1,3-propanediamine, 1,4-butanediamine, 1,6-hexanediamine, 2,5-dimethyl-2,5-hexanediamine; primary cycloaliphatic diamines, such as 1,2- and 1,4-cyclohexanediamine, isophorone diamine, 4,4'-methylene biscyclohexanamine, 4,4'-methylenebis-(2-methylcyclohexanamine), 4,4'-methylenebis-(2,6-diethylcyclo-hexanamine); aromatic diamines, such as 1,2-, 1,3- and 1,4-diamino-benzene, 2,4- and 2,6-diaminotoluene, 1,5-diaminonaphthalene, bis(4-aminophenyl)-methane and 3,3'-dimethylbenzidine; araliphatic diamines, such as 1,3-bisaminomethyl-benzene and 1,3-bisaminomethyl-4,6-dimethylbenzene; polyamines, such as diethylenetriamine or triethylenetetramine; heterocyclic amines or amines with heterocyclic radicals, such as 3-aminosulfolane, 2-aminomethylfuran, pyrrolidine, piperidine, hexamethyleneimine, 2-methylpiperidine, 2-methylindolenine, indole, carbazole, ε-caprolactam, pyrazole, 3,5-dimethylpyrazole, 2-aminopyridine, piperazine, 1-methylpiperazine, 1-hydroxyethylpiperazine, 1-piperazine ethylamine, imidazole, 2-methylimidazole, benzimidazole, 2-aminopyrimidine, 2-amino-4-methylpyrimidine, 2-hydrazino-pyrimidine, triazole, 3-amino-1,2,4-triazole, morpholine, N-(3-aminopropyl)-morpholine, silane-functional amines, such as aminopropyltrimethoxysilane and aminopropyltriethoxysilane.

Examples of monoisocyanate component E) include aliphatic monoisocyanates such as 1-butyl isocyanate, 1-pentyl isocyanate, 1-hexyl isocyanate, 1-heptyl isocyanate, 1-octyl isocyanate, 2-ethylhexyl isocyanate, 1-nonyl isocyanate, 1-decyl isocyanate, 1-dodecyl isocyanate, stearyl isocyanate, etc. Isocyanates with 8 to 18 carbon atoms are preferred, monoisocyanates with 10 to 18 carbon atoms being more preferred.

Examples of polyisocyanate component F) include commercially available lacquer polyisocyanates, in other words in particular the known modification products of simple diisocyanates containing urethane groups, uretdione groups, allophanate groups and in particular biuret groups, isocyanurate groups and iminooxadiazine-dione groups, examples of suitable diisocyanates being 1,6-diisocyanatohexane, 1-isocyanato-3,3,5-trimethyl-5-isocyanatomethylcyclohexane (isophorone diisocyanate), 4,4'-diisocyanatodicyclohexylmethane, 1,4-diisocyanatocyclohexane, 1-methyl-2,4-diisocyanatocyclohexane and its mixtures with up to 35 wt. %, referred to the total mixture, of 1-methyl-2,6-diisocyanatocyclohexane; 2,4-diisocyanato-toluene and its mixtures with up to 35 wt. %, referred to the total mixture of 2,6- diisocyanototoluene or its mixtures. More preferably used are the lacquer polyisocyanates with aliphatically and/ or cycloaliphatically bound, free isocyanate groups. A suitable polyisocyanate that does not contain the aforementioned groupings is 4-isocyanatomethyl-1,8-octane diisocyanate.

Lacquer polyisocyanates containing urethane groups include for example the reaction products of 2,4- and optionally 2,6-diisocyanatotoluene or 1-methyl-2,4-diisocyanatocyclohexane and optionally 1-methyl-2,6-diisocyanatocyclohexane with sub-stoichiometric amounts of trimethylolpropane, or their mixtures with simple diols such as the isomeric propanediols or butanediols. The production of such urethane group-containing acquer polyisocyanates in practically monomer-free form is described for example in DE-A 1 090 196.

The biuret group-containing acquer polyisocyanates that are more preferred for use according to the invention include those based on 1,6-diisocyanatohexane and are described for example in EP-A 0 003 505, DE-A 1 101 394, U.S. Pat. No. 3,358,010 or U.S. Pat. No. 3,903,127.

The more preferred isocyanurate group-containing lacquer polyisocyanates include also the trimers or mixed trimers of the diisocyanates mentioned above, such as the isocyanurate group-containing polyisocyanurates based on diisocyanatotoluene according to GB-A 1 060 430, GB-A 1 506 373 or GB-A 1 485 564, the mixed trimers of diisocyanatotoluene with 1,6-diisocyanatohexane, which may be obtained for example according to DE-A 1 644 809 or DE-A 3 144 672, and in particular the aliphatic, aliphatic-cycloaliphatic and cycloaliphatic trimers or mixed trimers based on 1,6-diisocyanatohexane and/or isophorone diisocyanate, which may be obtained for example according to U.S. Pat. No. 4,324,879, U.S. Pat. No. 4,288,586, DE-A 3 100 262, DE-A 3 100 263, DE-A 3 033 860 or DE-A 3 144 672. The lacquer polyisocyanates that may be used according to the invention generally have an isocyanate content of 5 to 25 wt. %, an average NCO functionality of 2.1 to 5.0, preferably 2.8 to 4.0, and a residual content, used for their production, of monomeric diisocyanates of less than 2 wt. %, preferably less than 0.5 wt. %. Mixtures of the lacquer polyisocyanates may also be used.

The production of the polyurethanes according to the invention is carried out in one or several stages. A one-stage reaction is understood in this context to mean the reaction of the total amount of the component a1) with the total amount of components B), C), D) and optionally E) and F). In this context component A) is formed in situ depending on the chosen amount of component C). A multi-stage reaction consists for example in reacting part of the component a1) with part of component C), followed by reacting resultant component A) with component B), the remainder of component C), component D) as well as optionally components E) and F). A multi-stage reaction can also or additionally consist of a separate reaction of part of or the total amount of monoalcohol components B) with a molar excess of diisocyanate components C) followed by reaction of the resulting NCO prepolymer with the previously produced component A), component D) and optionally components E) and F). The sequence of the reactions is in this case largely unimportant, and it only has to be ensured that the component A) according to the above definition can be formed by suitably choosing the amounts to be used of components A) to D) and optionally E) and F). It has in fact proved advantageous to add component D) to the reaction mixture only towards the end of the completed reaction of components A) to C) and optionally E) and F), and then allow it to react. Compatible highly effective polyurethane thickening agents that are readily soluble are thereby formed. In a particular embodiment hydroxyfunctional amines are used as component D), whereby highly effective polyurethanes can be produced that impart a particularly good storage stability to the formulated paint and effectively prevent the undesirable formation of a so-called "serum", i.e. the formation of a liquid layer on the paint surface.

In a preferred process variant the urethane group-containing polyether polyol a2) is produced by partial reaction of polyether polyol a1) with a diisocyanate.

The urethane group-containing polyether polyol a2) is also preferably produced by partial reaction of polyether polyol a1) with polyisocyanates having an average functionality of $\geq 2$.

The polyurethanes according to the invention produced in this way are generally colorless to yellowish waxes or highly viscous polymers having softening points or softening ranges within the temperature range from 10° to 80° C. For subsequent use it is often advantageous to mix the polyurethanes according to the invention with additives, such as formulation agents, solvents, water, emulsifiers or stabilizers, to form liquid formulations.

The polyurethanes according to the invention are suitable for adjusting the flow properties of aqueous paint systems, adhesives and other aqueous formulations. They are used to thicken aqueous or predominantly aqueous systems such as colorant, leather and paper auxiliary substances, preparations for petroleum extraction, detergent and adhesive preparations, waxes for polishes, formulations for pharmaceutical and veterinary purposes, plant protection preparations, cosmetics particles, etc. Also the water itself can be thickened with the polyurethane thickeners according to the invention so that optionally further additives can be added or alternatively the water itself can be added to aqueous preparations. The thickeners according to the invention may be used in mixtures with other thickening agents, such as those based on polyacrylates, cellulose derivatives or inorganic thickening agents.

Examples of aqueous systems that can be thickened according to the invention are aqueous polyacrylate dispersions, aqueous dispersions of copolymers of olefinically unsaturated monomers, aqueous polyvinyl acetate dispersions, aqueous polyurethane dispersions, aqueous polyesters dispersions and in particular ready-for-use preparations of the type already described above based on such dispersions or mixtures of such dispersions.

The polyurethanes according to the invention may obviously be used in bulk as thickening agents, preferably as granules or optionally powders. It is preferred however to use liquid formulations that contain, in addition to the polyurethanes according to the invention, also water, solvents such as butyl diglycol, isopropanol, methoxypropyl acetate, ethylene glycol and/or propylene glycol, non-ionic emulsifiers, surfactants and/or optionally further additives since in this way the incorporation of the thickening agents according to the invention into aqueous or predominantly aqueous systems is substantially facilitated.

The ready-for-use preparations of the thickening agents according to the invention are more preferably aqueous solutions or dispersions having a solids content of 10 to 80, preferably 30 to 60 and more preferably 40 to 50 wt. %.

The amount of thickening agents according to the invention that is added to the aqueous or predominantly aqueous systems in order to achieve the desired thickening effect depends on the intended use and may be determined by the person skilled in the art in a few preliminary experiments. As a rule 0.05 to 10 wt. %, preferably 0.1 to 4 wt. % and more preferably 0.1 to 2 wt. % of the thickening agent according to the invention is used, these percentage figures referring to the solids content of the thickening agent on the one hand and to the solids content of the aqueous system to be thickened on the other hand.

The evaluation of the effectiveness of the thickening agents according to the invention may be carried out by known methods, for example in a Haake rotary viscosimeter, in a Stormer or Brookfield viscosimeter, or in an ICI viscosimeter.

EXAMPLES

Abbreviations

DBTL: dibutyltin dilaurate
IPDA: isophorone diamine

Raw Materials Used
Polyether a1)

| I | Polyether based on glycerol and a mixture of ethylene oxide and propylene oxide (ratio 75:25) and with an OH number of ca. 18 mg KOH/g |
|---|---|
| II | Polyether based on glycerol and ethylene oxide with an OH number of ca. 17 mg KOH/g |

Production of the Polyurethanes According to the Invention

Example 1

One-pot Reaction 915 g (0.3 mole OH groups) of polyether I were weighed out under nitrogen in a 2 l capacity glass flask and freed from traces of water within 5 hours at 1 mbar/125° C. After cooling to 80° C., 14.26 g of 1-octanol (0.11 mole OH groups) and 22.1 g of 1-decanol (0.14 mole OH groups) were added and stirred for 15 minutes. Following this 66.58 g of isophorone diisocyanate (0.60 mole of isocyanate groups) and 0.09 g of DBTL were added at 80° C. and were then stirred at 80° C. until an isocyanate content of 0.2 wt. % was reached. 1.45 g of hexamethylenediamine were then added and stirred at 80° C. until isocyanate bands could no longer be detected by IR spectroscopy. A highly viscous, pale yellowish polyurethane resin was obtained.

Example 2

Two-stage Process 915 g (0.3 mole of OH groups) of polyether I were weighed out under nitrogen in a 2 l capacity glass flask and freed within 5 hours from traces of water at 1 mbar/ 125° C. After cooling to 120° C., 3.22 g of isophorone diisocyanate were added (0.03 mole of isocyanate groups) and stirred at 120° C. until isocyanate bands could no longer be detected by IR spectroscopy. After cooling to 80° C., 14.26 g of 1-octanol (0.11 mole of OH groups) and 22.1 g of 1-decanol (0.14 mole of OH groups) were added and stirred for 15 minutes. Following this 60.98 g of isophorone diisocyanate (0.55 mole of isocyanate groups) and 0.09 g of DBTL were added at 80° C. and then stirred at 80° C. until an isocyanate content of 0.2 wt. % had been reached. 2.11 g of isophorone diamine (0.025 mole of amino groups) were then added and stirred at 80° C. until isocyanate bands could no longer be detected by IR spectroscopy. A highly viscous, pale yellowish polyurethane resin was obtained.

The polyurethane thickeners listed in the following Table 1 were produced similarly to Example 1 and dissolved after completion of the reaction to form 60% solutions in water, [1])Levalin FD and [1])Emulsifier W (ratio 3:2:1). In the case where monoisocyanates are used the polyether employed is first of all completely reacted with the monoisocyanate, and only then is the reaction with the alcohols and the diisocyanate carried out.

The polyurethane thickeners listed in the following Table 2 were produced similarly to Example 2 and after completion of the reaction were dissolved to form 60% solutions in water, [1])Levalin FD and [1])Emulsifier WN (ratio 3:2:1).

The specified gram-equivalents do not represent the gram-equivalent amounts actually employed, but give the gram-equivalent ratio of the reactants that are used.

TABLE 1

Polyurethane thickeners according to Example 1

| Example | Polyether (g.-equiv.) | Diisocyanate (g.-equiv.) | Monoalcohol (g.-equiv.) | Component D (g.-equiv.) | Catalyst |
|---|---|---|---|---|---|
| 3 | I (2.9) | IPDI (5.5) | 1-dodecanol (1.4) 1-octanol (1.1) | cyclohexylamine (0.25) | DBTL |
| 4 | I (2.9) | IPDI (5.5) | 1-decanol (1.4) 1-octanol (1.1) | IPDA (0.25) | DBTL |
| 5 | I (2.9) | IPDI (5.5) | 1-dodecanol (1.0) 1-octanol (1.5) | butanon oxime (0.15) | DBTL |
| 6 | I (3.0) | IPDI (5.5) | 1-decanol (1.25) 1-octanol (1.25) | diethanolamine (0.20) | DBTL |

TABLE 2

Polyurethane thickeners according to Example 2

| Example | Polyether (g.-equiv.) | Diisocyanate (g.-equiv. 1/g.-equiv. 2) | Monoalcohol or Monoisocyanate (g.-equiv.) | Component D (g.-equiv.) | Catalyst |
|---|---|---|---|---|---|
| 7 | I (2.9) | IPDI (0.1/5.0) | 1-decanol (1.4) 1-octanol (1.1) | IPDA (0.1) | DBTL |
| 8 | I (3.0) | IPDI (0.2/5.0) | 1-decanol (1.4) 1-octanol (1.1) | IPDA (0.2) | DBTL |
| 9 | I (3.0) | IPDI (0.3/5.0) | 1-decanol (1.4) 1-octanol (1.1) | IPDA (0.3) | DBTL |
| 10 | I (2.9) | IPDI (0.3/5.25) | 1-decanol (1.4) 1-octanol (1.1) | n-butylamine (0.25) | DBTL |
| 11 | I (2.9) | IPDI (0.3/5.5) | 1-decanol (1.4) 1-octanol (1.1) | n-butylamine (0.25) | DBTL |
| 12 | I (2.9) | IPDI (0.3/5.35) | 1-decanol (1.4) 1-octanol (1.1) | IPDA (0.1) | DBTL |
| 13 | I (2.9) | IPDI (0.3/5.35) | 1-decanol (1.4) 1-octanol (1.1) | n-butylamine (0.1) | DBTL |
| 14 | I (2.9) | IPDI (0.3/5.35) | 1-decanol (1.4) 1-octanol (1.1) | diethanolamine (0.3) | DBTL |
| 15 | I (2.9) | IPDI (0.3/5.35) | 1-decanol (1.4) 1-octanol (1.1) | IPDA (0.3) | DBTL |
| 16 | I (2.9) | IPDI (0.3/5.35) | 1-decanol (1.4) 1-octanol (1.1) | IPDA (0.2) | DBTL |
| 17 | II (2.9) | IPDI (0.3/5.35) | 1-decanol (1.4) 1-octanol (1.1) | diethanolamine (0.2) | DBTL |
| 18 | I (2.9) | IPDI (0.3/3.3) | dodecyl isocyanate (1.0) 1-octanol (1.5) | diethanolamine (0.2) | DBTL |

Comparison Example 1

1) Production of a prepolymer from isophorone diisocyanate and 1-dodecanol 1110 g of isophorone diisocyanate (10 gram-equivalents) were placed under a nitrogen atmosphere in a 2 l capacity three-necked flask equipped with stirrer, reflux cooler and dropping funnel and heated to 100° C. while stirring. 186 g (1 gram-equivalent) of 1-dodecanol were then added dropwise within 60 minutes. The mixture was then stirred for a further 2 hours at 100° C. Following this the resultant product was subjected to thin layer distillation (170° C., 0.25 mbar) and the excess isophorone diisocyanate was thereby completely removed. A colorless viscous resin with an isocyanate content of 10.8% was obtained.

2) Production of a polyurethane thickener using a prepolymer

The procedure of Example 3 was followed except that the polyether I was reacted with the aforedescribed prepolymer instead of with IPDI/dodecanol. A pale yellow resin was formed that was dissolved to form a 60% solution in water, Levalin FD® and Emulsifier WN® (3:2:1).

Examples of Use

The following examples show that emulsion paints having improved coating properties ("coating brake") can be obtained with the thickening agents according to the invention.

Production of the Coating Compound and Testing of the Coating Properties

The following constituents are dispersed over 30 minutes in a 1000 ml flask with 100 glass beads (Ø 3 mm) using a Skandex disperser:

| | |
|---|---|
| AMP (aminopropanol)[1] | 1.25 g |
| Borchigen ND (25% in H$_2$O)[2] | 6.8 g |
| Neocryl AP 2860 (20%) defoaming agent[3] | 1.6 g |
| Thickener (50%) | 10.0 g |
| TiO$_2$ RHD-2 (Tioxide Company) | 112.5 g |

-continued

| | |
|---|---|
| Methoxybutanol | 8.5 g |
| Propylene glycol | 8.5 g |
| Butyl diglycol | 8.5 g |
| H$_2$O | 22.35 g |
| then after the addition of H$_2$O | 50.0 g |
| Neocryl XK 62 (42%)[4] | 270.0 g |
| | 500.0 g | is dispersed for a further 30 minutes. The colorant is freed from the glass beads and after a maturation time of ca. 12 hours was coated onto a plastics film (Linetta film) using a brush. The quality of the coat (coating properties) are evaluated on a scale ranging from I (very good) to X (very poor) ("brush resistance" in Tables 3 to 5).

[1] (2-amino-2-methylpropanol-1, 90% in water), Angus Chemie GmbH, Essen
[2] Wetting agent, Borchers GmbH, Monheim
[3] Defoaming agent, ICI Resins, Runcorn, England
[4] Anionic dispersion based on acrylate/styrene, ICI Resins The viscosity measurements were made in the low-shear range at 10.3 s$^{-1}$ using an Haake VT 500 viscosimeter (measurement body SV DIN), and in the high-shear range at 10000 s$^{-1}$ using a Physika Rheolab MCI viscosimeter.

TABLE 4

Application technology testing of the products of Table 2

| Thickener from | Viscosity (mPa · s) at s$^{-1}$ | | Brushing |
|---|---|---|---|
| Example No. | 10.3 | 10000 | Properties |
| 7 | 1250 | 220 | III |
| 8 | 1300 | 270 | III |
| 9 | 1670 | 300 | III |
| 10 | 1950 | 300 | III |
| 11 | 2500 | 340 | II |
| 12 | 2300 | 305 | II |
| 13 | 1600 | 290 | II |
| 14 | 1200 | 270 | II–III |
| 15 | 2500 | 290 | II |
| 16 | 1400 | 270 | III |
| 17 | 2150 | 260 | II |
| 18 | 1700 | 270 | III |
| As comparison: | | | |
| Bermodol 2110 | 450 | 110 | VII |
| Acrysol 2020 | 350 | 100 | VII |
| Comp. Example 1 | 9200 | 130 | VII |

Table 5 shows the use of the thickening agents according to the invention in combination with cellulose derivatives (Walocel XM 20000 PV; Bochers GmbH, Monheim)

TABLE 5

Application technology testing

| Product from | Combination | PUR Thickener/ Combination Partner Ratio | Viscosity (mPa · s) at s$^{-1}$ | | Brushing |
|---|---|---|---|---|---|
| Example No. | Partner | (wt. %, refd. to paint) | 10.3 | 10 000 | Properties |
| 14 | a | 0.25:0.25 | 3100 | 170 | IV |
| 14 | a | 0.25:0.40 | 7100 | 170 | IV |
| 14 | b | 0.40:0.10 | 10300 | 300 | II |
| 14 | c | 0.25:0.25 | 7200 | 190 | IV |
| 14 | d | 0.50:0.40 | 9300 | 300 | II |
| 14 | e | 0.25:0.25 | 7500 | 325 | II |
| As comparison Bermodol 2110 | | 0.50:0.40 | 7200 | 150 | VI |

TABLE 3

Application technology testing of the products of Table 1

| | Viscosity (mPa · s) at s$^{-1}$ | | Brushing |
|---|---|---|---|
| Example No. | 10.3 | 10000 | Properties |
| 3 | 920 | 215 | III |
| 4 | 980 | 180 | IV |
| 5 | 1500 | 240 | III |
| 6 | 1700 | 250 | III |
| As comparison: | | | |
| Bermodol 2110[a] | 450 | 110 | VII |
| Acrysol 2020[b] | 350 | 100 | VII |
| Comp. Example 1 | 9200 | 130 | VII |

[a] AKZO
[b] Rohm & Haas Co.

Combination partners a: Walocel XM 20000 PV*)  b: Walocel MT 20000 PV*)
c: Borchigel L 75 N*)     d: Borchigel L 76*)
d: Borchigel PW 25*)

*)Borchigel GmbH, Monheim

Summary

From the test results given in Tables 3 to 5 it can clearly be seen that the polyurethane thickeners according to the invention always have a better thickening effect in the high-shear range and generally have a better thickening effect in the low-shear range than the comparison products. The brushing properties of the paints with the polyurethane thickeners according to the invention are in all cases better than the brushing properties of the paints containing the comparison products.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A water-soluble or water-dispersible polyurethane comprising a reaction product of A) at least one polyether polyol a1) having an average functionality of $\geq 3$ and at least one urethane group-containing polyether polyol a2) having an average functionality of $\geq 4$, B) at least one $C_6$–$C_{22}$ monoalcohol, C) at least one (cyclo)aliphatic and/or aromatic diisocyanate D) a $C_2$–$C_{18}$ oxime, E) optionally at least one $C_4$–$C_{18}$ monoisocyanate, and F) optionally at least one polyisocyanate having an average functionality of >2 wherein the starting NCO/OH equivalent ratio is between 0.5:1 to 1.2:1.

2. The polyurethane of claim 1, wherein the polyether polyol a1) has an average functionality of 3 to 4.

3. The polyurethane of claim 1, wherein the polyether polyol a1) has an average functionality of 4 to 6.

4. The polyurethane of claim 1, wherein component B) comprises a $C_6$–$C_{22}$ monoalcohol.

5. The polyurethane of claim 1, wherein component B) comprises a $C_8$–$C_{18}$ monoalcohol.

6. The polyurethane of claim 1, wherein component B) comprises a $C_8$–$C_{14}$ monoalcohol.

7. The polyurethane of claim 1, wherein the component C) comprises a (cyclo)aliphatic diisocyanate.

8. A process for the production of the water-soluble or water-dispersible polyurethane of claim 1, comprising reacting A) a mixture of at least one polyether polyol a1) having a mean functionality of $\geq 3$ and at least 1 urethane group-containing polyether polyol a2) having an average functionality of $\geq 4$.

B) at least one $C_6$–$C_{22}$ monoalcohol,

C) at least one (cyclo)aliphatic and/or aromatic diisocyanate,

D) a $C_2$–$C_{18}$ oxime,

E) optionally at least one $C_4$–$C_{18}$ monoisocyanate, and

F) optionally at least one polyisocyanate having an average functionality of >2 at a starting NCO/OH equivalent ratio of 0.5:1 to 1.2:1.

9. The process of claim 8, wherein the urethane group-containing polyether polyol a2) comprises the reaction product of the polyether polyol a1) with a diisocyanate.

10. The process of one of claim 8 or 9, wherein the urethane group-containing polyether polyol a2) comprises the reaction product of the polyether polyol a1) with polyisocyanates having an average functionality of $\geq 2$.

11. A process for adjusting the flow properties of an aqueous paint system, adhesive and another aqueous formulation comprising adding the polyurethane of claim 1 thereto.

12. An aqueous paint system, adhesive and another aqueous formulation comprising the polyurethane of claim 1.

* * * * *